United States Patent
Li et al.

(10) Patent No.: US 11,878,701 B2
(45) Date of Patent: Jan. 23, 2024

(54) METHOD AND DEVICE FOR CONTROLLING AN AUTONOMOUS DRIVING VEHICLE, AND AN AUTONOMOUS DRIVING VEHICLE

(71) Applicant: Beijing xiaoma zhixing technology co. LTD, Beijing (CN)

(72) Inventors: Lintao Li, Beijing (CN); Chao Yan, Beijing (CN); Yufan Heng, Beijing (CN)

(73) Assignee: Beijing xiaoma zhixing technology co. LTD, Beijing (CN)

( * ) Notice: Subject to any disclaimer, the term of this patent is extended or adjusted under 35 U.S.C. 154(b) by 281 days.

(21) Appl. No.: 17/226,115

(22) Filed: Apr. 9, 2021

(65) Prior Publication Data

US 2021/0331687 A1 Oct. 28, 2021

(30) Foreign Application Priority Data

Apr. 27, 2020 (CN) .......................... 202010346347.7

(51) Int. Cl.
*B60W 50/02* (2012.01)
*B60W 60/00* (2020.01)
*G01C 21/34* (2006.01)
*B60W 50/06* (2006.01)

(52) U.S. Cl.
CPC .... *B60W 50/0205* (2013.01); *B60W 50/0225* (2013.01); *B60W 50/06* (2013.01); *B60W 60/001* (2020.02); *G01C 21/3446* (2013.01); *B60W 2050/021* (2013.01); *B60W 2420/52* (2013.01)

(58) Field of Classification Search
CPC .......... G01C 21/3446; B60W 50/0205; B60W 50/0225; B60W 50/06; B60W 60/001; B60W 2050/021; B60W 2420/52; G06F 11/0739; G06F 11/0751; G06F 11/0793; G06F 11/1438; G06F 11/3013; G06F 8/65
See application file for complete search history.

(56) References Cited

U.S. PATENT DOCUMENTS

| 11,403,087 | B2 * | 8/2022 | Lin | G06F 8/65 |
| 2007/0005609 | A1 * | 1/2007 | Breed | B60W 50/00 |
| 2012/0198435 | A1 * | 8/2012 | Dirstine | G06F 8/65 |
|  |  |  |  | 717/172 |

(Continued)

*Primary Examiner* — Geepy Pe
*Assistant Examiner* — Kimia Kohankhaki
(74) *Attorney, Agent, or Firm* — Yu Gang

(57) ABSTRACT

A method and device for controlling an autonomous driving vehicle, and an autonomous driving vehicle. Wherein the method comprises: detecting error information of different components in a vehicle, wherein the different components comprise at least one of the following: a power supply, a sensor, a navigation device, a log memory and a processing device; if the error information of any component is detected, feeding back the detected error information to a processor; restarting the vehicle' automatic driving function based on a feedback result, wherein the feedback result is feedback by the processor according the detected error information. The present invention solves the technical problem that the autonomous driving vehicle in the related art cannot perform error information detection on the components in the vehicle which leads to the low reliability of the autonomous driving vehicle.

10 Claims, 1 Drawing Sheet

(56) References Cited

U.S. PATENT DOCUMENTS

| | | | |
|---|---|---|---|
| 2018/0032081 A1* | 2/2018 | Etoh | G05D 1/0255 |
| 2018/0112983 A1* | 4/2018 | Ahmed | G01C 21/30 |
| 2019/0064799 A1* | 2/2019 | Amirloo Abolfathi | B60W 50/0205 |
| 2021/0129855 A1* | 5/2021 | Nakao | B60W 50/0225 |

* cited by examiner

METHOD AND DEVICE FOR CONTROLLING AN AUTONOMOUS DRIVING VEHICLE, AND AN AUTONOMOUS DRIVING VEHICLE

TECHNICAL FIELD

The invention relates to the technical field of autonomous driving vehicle control, in particular to a method and device for controlling an autonomous driving vehicle, and an autonomous driving vehicle.

BACKGROUND

As a means of transportation, vehicles provide great convenience for people's travel. At present, science and technology are continuously developed and embodied in vehicles, such as autonomous driving vehicles. The appearance of the autonomous driving vehicle once again improves the travel experience of users. As long as the user sets a target position, he can be carried to the target position by the autonomous driving vehicle without personally driving the vehicle. However, the intelligence degree of the current autonomous driving vehicle is limited, and the error information of different components in the vehicle cannot be detected, which results in that when error information occurs in one or more components in the vehicle, the error information cannot be processed in time, and further there may be a safety hazard, which may also affect the travel efficiency of the user.

In view of the problem in the related art that automatic driving of a vehicle cannot perform error information detection on components in the vehicle, which leads to a problem of low reliability of automatic driving of the vehicle, no effective solution has been proposed at present.

SUMMARY

The embodiments of the present invention provide a method and device for controlling an autonomous driving vehicle, and an autonomous driving vehicle, so as to at least solve the technical problem that the autonomous driving vehicle in the related art cannot detect error information of the components in the vehicle, which leads to the low reliability of the autonomous driving vehicle.

According to an aspect of the embodiments of the present invention, a method for controlling an autonomous driving vehicle is provided, which may include the following steps: error information of different components in the vehicle is detected, wherein the different components comprise at least one of the following: a power supply, a sensor, a navigation device, a log memory, and a processing device; in response to detected error information of any component, feeding back the detected error information to a processor; restarting the vehicle' automatic driving function based on a feedback result, wherein the feedback result is feedback by the processor according the detected error information.

Optionally, when the sensor is an inertial sensor, the method for controlling the autonomous driving vehicle may further include: acquiring the data sensed by the inertial sensor; and calculating based on the data, a navigation path of the vehicle by using a navigation algorithm, wherein the vehicle is compatible with at least one type of inertial sensor.

Optionally, the method for controlling the autonomous driving vehicle may further include: setting priorities of different radars; determining the time synchronization protocol of the different radars based on the priorities of different radars; and controlling the different radars to synchronize time according to the corresponding time synchronization protocol.

Optionally, the method for controlling the autonomous driving vehicle may further include: receiving an external upgrading instruction, and receiving an upgrading file in combination with a LTE module; and entering an on-line upgrading mode or an off-line upgrading operating mode based on the external upgrading instruction, and running the upgrading file to complete system upgrading.

Optionally, the method for controlling an autonomous driving vehicle may further include: acquiring different reset instructions, wherein the different reset instructions are configured to control different components in the vehicle to reset, and the different reset instructions includes reset priorities; controlling the corresponding component to reset according to the reset priorities of the different reset instructions; and when the corresponding component is successfully reset, restarting the corresponding component to enter a working mode.

Optionally, controlling the corresponding component to reset according to the reset priorities of the different reset instructions comprises: putting components to be reset into a reset queue; switching the components to be reset in the reset queue to be reset states; when the components in the reset states are successfully reset, switching the successfully reset components into be waiting states; and after reaching a predetermined period, the successfully reset components are switched from the waiting states to the enabling states.

Optionally, in the event that each component to be reset in the reset queue is successfully reset, an operating state of the component is detected, and the component in the enabling state is switched to a receiving state to receive an external control instruction.

According to another aspect of the embodiments of the present invention, there is also provided a device for controlling an autonomous driving vehicle, including: a detection module, configured to detect error information of different components in a vehicle, wherein the different components comprise at least one of the following: a power supply, a sensor, a navigation device, a log memory and a processing device; a feedback module, configured to feed back detected error information to a processor in response to the detected error information of any component; and a restart module, configured to restart the vehicle' automatic driving function based on a feedback result, wherein the feedback result is feedback by the processor according the detected error information.

Optionally, the device for controlling the autonomous driving vehicle further comprises: a first acquisition module, configured to acquire data sensed by an inertial sensor; and a calculation module, configured to calculate calculating based on the data, a navigation path of the vehicle by using a navigation algorithm, wherein the vehicle is compatible with at least one type of inertial sensor.

Optionally, the device for controlling the autonomous driving vehicle further comprises: a setting module, configured to set priorities of different radars; a determination module, configured to determine time synchronization protocols of the different radars based on the priorities of the different radars; and a synchronization module, configured to synchronize time by different radars according to a corresponding time synchronization protocol.

Optionally, the device for controlling the autonomous driving vehicle further comprises: a receiving module, configured to receive an external upgrading instruction and receiving an upgrading file in combination with a Long Term Evolution (LTE) module; and an upgrading module, configured to enter an on-line upgrading mode or an off-line upgrading working mode based on the external upgrading instruction, and running the upgrading file to complete system upgrading.

Optionally, the device for controlling the autonomous driving vehicle further comprises: a second acquisition module, configured to acquire different reset instructions, wherein the different reset instructions are configured to control different components in the vehicle to reset, and the different reset instructions comprises reset priorities; a control module, configured to control a corresponding component to reset according to the reset priorities of the different reset instructions; and a starting module, configured to restart corresponding component to enter a working mode, when the corresponding component is successfully reset.

Optionally, the control module comprises: a setting module, configured to put the components to be reset into a reset queue; a first switching module, configured to switch the components to be reset in the reset queue to be reset states; a second switching module, configured to switch the successfully reset components into be waiting states, when the components in the reset states are successfully reset; and a third switching module, configured to switch the successfully reset components from the waiting states to enabling states after a predetermined period is reached.

Optionally, when each component to be reset in the reset queue is successfully reset, an operating state of the component is detected, and the component in the enabling state is switched to a receiving state to receive an external control instruction.

According to another aspect of the embodiments of the present invention, there is also provided a computer-readable storage medium, wherein the computer-readable storage medium comprises a computer program, when the computer program is run, a device where the computer-readable storage medium is located is controlled to execute the method for controlling the autonomous driving vehicle described above.

According to another aspect of the embodiments of the present invention, there is also provided a processor for running a program, when being run, the program executes the method for controlling the autonomous driving vehicle described above.

According to another aspect of the embodiments of the present invention, there is also provided an autonomous driving vehicle including a memory and a processor coupled to the memory, wherein the memory and the processor communicate via a bus system; the memory is used for storing a program, wherein when the program is executed by the processor, the program controls an apparatus on which the memory is located to execute any one of the method for controlling the autonomous driving vehicle described above; the processor is used for running a program, wherein the program executes any one of the method for controlling the autonomous driving vehicle described above.

In the embodiments of the present invention, the error information of different components in the vehicle can be detected, wherein the different components comprise at least one of the following: a power supply, a sensor, a navigation device, a log memory, and in response to detected error information of any component, feeding back the detected error information to a processor; the automatic driving function of the vehicle is restarted based on the feedback result. The method for controlling the autonomous driving vehicle provided in the embodiments of the present invention realizes the purpose of detecting different components of the vehicle to determine whether there is error information in different components, and when there is error information in the components of the vehicle, the processor is used to analyze and process the error information, and the automatic driving function of the vehicle is restarted based on the feedback result of the processor. This achieves the technical effect of improving the reliability of the vehicle, and thus solves the technical problem that the autonomous driving vehicle in the related technology cannot perform error information detection on the components in the vehicle, which leads to the low reliability of the autonomous driving vehicle.

BRIEF DESCRIPTION OF THE DRAWINGS

The accompanying drawings are illustrated to provide a further understanding of the invention and are incorporated in and constitute a part of this application. The exemplary embodiments of the present invention and the description thereof are used to explain the present invention, and do not constitute an improper limitation of the present invention. In the drawings.

DETAILED DESCRIPTION OF THE EMBODIMENTS

Figure 1:
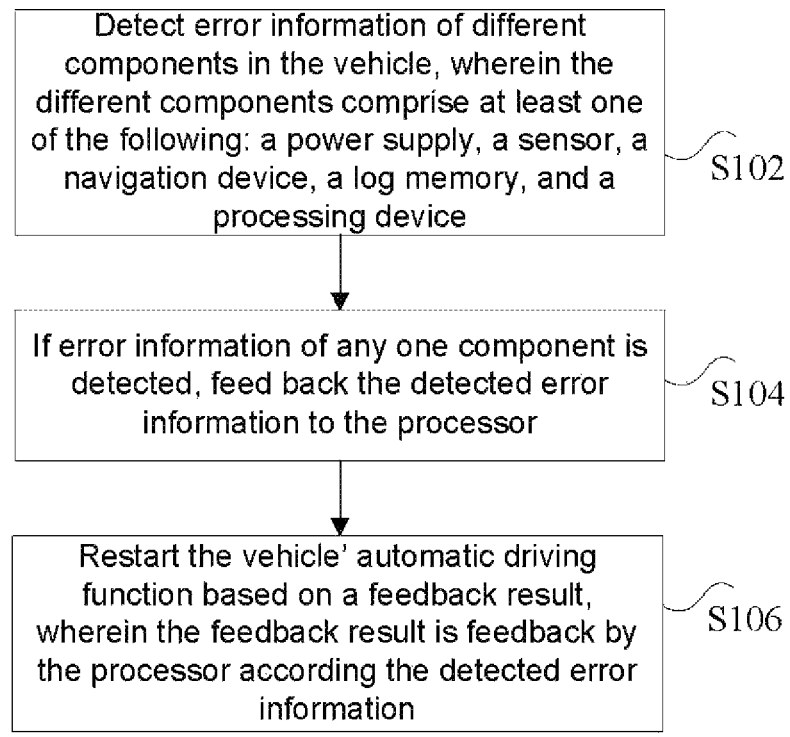
FIG. 1 illustrates a flowchart of a method for controlling an autonomous driving vehicle according to an embodiment of the present invention.

In order to enable those skilled in the art to better understand the solution of the present invention, the technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of ordinary skills in the art without involving any inventive efforts are within the scope of the present invention.

It is to be understood that the terms "first", "second", and the like in the description and claims of the present invention and in the drawings described above are used for distinguishing between similar objects and not necessarily for describing a particular order or sequential order. It is to be understood that the data so used are interchangeable under appropriate circumstances such that the embodiments of the invention described herein are capable of operation in sequences other than those illustrated or described herein. Furthermore, the terms "comprising" and "having", as well as any variations thereof, are intended to cover a non-exclusive inclusion. For example, a process, method, system, article, or apparatus that comprises a list of steps or units is not necessarily limited to those steps or units expressly listed, but may include other steps or units not expressly listed or inherent to such process, method, article, or apparatus.

Embodiment 1

In accordance with an embodiment of the present invention, there is provided a method embodiment of a method for controlling an autonomous driving vehicle. It is noted that the steps illustrated in the flowchart of the accompanying drawings may be performed in a computer system, such as a set of computer-executable instructions, and that, although a logical order is illustrated in the flowchart, in some instances, the steps illustrated or described may be performed in an order other than that disclosed herein.

FIG. 1 is a flowchart of a method for controlling an autonomous driving vehicle according to an embodiment of the present invention, and as shown in FIG. 1, the method for controlling the autonomous driving vehicle includes the following steps.

Step S102: Detect error information of different components in the vehicle, wherein the different components comprise at least one of the following: a power supply, a sensor, a navigation device, a log memory, and a processing device.

Optionally, the vehicle can be an autonomous driving vehicle; the error information is error information of different components in the autonomous driving vehicle.

Optionally, in embodiments of the present invention, the various components described above may include, but are not limited to: a power supply, a sensor, a navigation device, a log memory, and a processing device.

Optionally, the error information may be information that the supply voltage is different from the normal voltage, navigation error information of the navigation device, etc.

Step S104: If error information of any one component is detected, feedback the detected error information to the processor.

Step S106: Restart the vehicle' automatic driving function based on a feedback result, wherein the feedback result is feedback by the processor according the detected error information.

It can be seen from the above that in the embodiment of the present invention, the error information of different components in the vehicle is detected, wherein the different components comprise at least one of the following: a power supply, a sensor, a navigation device, a log memory, and a processing device; if error information of any one component is detected, feedback the detected error information to the processor; restart the vehicle' automatic driving function based on a feedback result, wherein the feedback result is feedback by the processor according the detected error information. It realizes the purpose of detecting different components of the vehicle to determine whether there is error information in different components, and when there is error information in the components of the vehicle, the processor is used to analyze and process the error information, and the automatic driving function of the vehicle is restarted based on the feedback result of the processor.

It is easy to notice that, in the embodiment of the present invention, different components of the vehicle can be detected in real time to determine whether there is error information in different components of the vehicle. If one or more components of the vehicle have errors, the error information of one or more components is feedback to the processor to use the processor to analyze and process the error information of one or more components, the feedback result of the processor is obtained and the obtained feedback result is used to restart the automatic driving function of the vehicle. It realizes the purpose of detecting different components of the vehicle to determine whether there is error information in different components, and when there is error information in the components of the vehicle, the processor is used to analyze and process the error information, and the automatic driving function of the vehicle is restarted based on the feedback result of the processor. So that the technical effect of improving the reliability of the vehicle is achieved.

Therefore, the method for controlling the autonomous driving vehicle provided in the embodiment of the present invention further solves the technical problem that the autonomous driving vehicle in the related art cannot detect error information of the components in the vehicle, which leads to the low reliability of the autonomous driving vehicle.

In an optional embodiment, when the sensor is an inertial sensor, the method for controlling the autonomous driving vehicle may further include: acquiring the data sensed by the inertial sensor; and using the navigation algorithm to calculate the navigation path of the vehicle based on the sensed data, where the vehicle is compatible with at least one type of inertial sensor.

The inertial sensor is mainly used for detecting and measuring accelerated speed, inclination, impact, vibration, rotation and multi-degree-of-freedom motion, and is an important component for solving navigation, orientation and motion carrier control.

Such data may include, but are not limited to, the following: accelerated speed, inclination angle, impact magnitude, vibration frequency.

The navigation algorithm described above is an energy-saving algorithm in which each node of the network can independently periodically determine and decide whether it should go to sleep or stay awake in a distributed manner. The node that remains awake acts as a coordinator and assumes the relay forwarding function on the current backbone route. The principle for judging whether stay awake to be a coordinator is as follows: when a node discovers that its two neighboring nodes can neither communicate with each other nor communicate through an existing coordinator, it considers that it should be a coordinator.

In addition, in the embodiment of the invention, most sensors of the autonomous driving vehicle are integrated, the vehicle is simplified, the complexity of the vehicle is reduced, the volume of the refitting equipment is reduced, and the system cost is also reduced.

The network part in the embodiment of the invention consists of two switch chips, and the interface part can comprise: one power interface, one gigabit ethernet interface, one communication interface, one auxiliary interface, four laser radar interfaces and four antenna interfaces (wherein, primary and secondary antenna of 4G and primary and secondary antenna of GNSS), so that the compatibility of an autonomous driving vehicle is improved, and multiple types of hardware apparatus can be compatible.

In addition, in the embodiment of the invention, information such as a navigation path can be calculated based on the inertial sensor combined with the navigation algorithm, and inertial sensors compatible with different types and signals can be supported so that the navigation function of the autonomous driving vehicle is more accurate.

In an optional embodiment, the method for controlling the autonomous driving vehicle may further include: setting the priority of different radars; determining the time synchronization protocols of the different radars based on the priorities; and different radars synchronizing time according to the corresponding time synchronization protocol.

For example, the priorities of different radars may be set, and the time synchronization protocols of the different radars may be determined according to the priorities of the different radars so that the time is differentiated according to the corresponding time synchronization protocol. Among them, the above-mentioned time synchronization protocol may be a Precision Time Protocol (PTP). That is, the synchronization of system time can be ensured by setting priority levels of different radars.

In addition, in general, two upgrading methods can be adopted for upgrading firmware running on a system: one is on-line upgrading, wherein the latest firmware is downloaded to a system from a server for upgrading; another is to use the storage apparatus of the system board to copy the firmware locally to the system for upgrading. In the embodiment of the invention, it is mainly the measures taken to prevent the system from crashing when the upgrading fails during the upgrading process, and to ensure the normal operation of the system.

In an optional embodiment, the method for controlling the autonomous driving vehicle may further include: receiving an external upgrading instruction, and receiving an upgrading file in combination with the LTE module; entering an on-line upgrading mode or an off-line upgrading working mode based on the external upgrading instruction, and running the upgrading file to complete system upgrading.

That is, the method for controlling an autonomous driving vehicle provided in the embodiment of the present invention supports on-line upgrading and an off-line upgrading of the system. For example, an on-line remote upgrading can receive an upgrading file through an IPC and an ARM core in combination with an LTE module, perform remote upgrading and extension on a hardware and software system, perform server feedback according to error information recorded in a log file, and obtain a solution from the server.

The IPC is an Industrial PC.

In an optional embodiment, the method for controlling an autonomous driving vehicle may further include: acquiring different reset instructions, wherein the different reset instructions are configured to control different components in the vehicle to reset, and the different reset instructions comprises reset priorities; controlling a corresponding component to reset according to the reset priorities of the different reset instructions; when the corresponding component is successfully reset, restarting the corresponding component to enter a working mode.

wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached.

In an optional embodiment, in the event that each component to be reset in the reset queue is successfully reset, an operating state of the component is detected, and the component in the enabling state is switched to a receiving state to receive an external control instruction.

In the embodiment of the invention, the nbox 2.5 is based on the nbox 2.0. Compared with the nbox 2.0, the algorithm is simpler, and the data flow direction is different from that of the nbox 2.0. The nbox 2.5 core processing unit is a Xilinx ZYNQ platform, the sensor module connected therewith is 4G, IMU and GNSS, and the network part consist of two SWITCH chips. The interface part comprises one POWER (power) interface, one GigE (gigabit ethernet) interface, one COMM (communication) interface, one AUX (auxiliary) interface, four LiDAR (laser radar) interfaces and four antenna interfaces (wherein, primary and secondary antenna of 4G and primary and secondary antenna of GNSS).

According to the method for controlling an autonomous driving vehicle provided by the embodiment of the invention, the following beneficial effects are achieved: 1, on-line remote upgrading; 2, a diagnosis function, namely feeding back, correcting and restarting the error information of a voltage source, a sensor and a file logging; 3, an accurate navigation algorithm: information such as a navigation path being calculated based on an IMU inertial sensor and a navigation algorithm, and inertial sensors compatible with different types and models being supported; 4, good compatibility: being compatible with multiple types of hardware apparatus; and 5, the PTP precise time synchronization protocol ensuring the synchronization of the system time by setting priorities.

Embodiment 2

Figure 2:
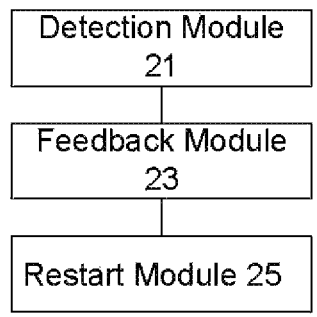
FIG. 2 illustrates a schematic view of a device for controlling an autonomous driving vehicle according to an embodiment of the present invention.

According to another aspect of an embodiment of the present invention, there is also provided a device for controlling an autonomous driving vehicle. FIG. 2 is a schematic view of the device for controlling the autonomous driving vehicle according to the embodiment of the present invention. As shown in FIG. 2, the device for controlling the autonomous driving vehicle includes a detection module 21, a feedback module 23 and a restart module 25. Hereinafter, the device for controlling the autonomous driving vehicle will be described in-detail.

The detection module 21 is configured to detect error information of different components in a vehicle, wherein the different components comprise at least one of the following: a power supply, a sensor, a navigation device, a log memory and a processing device.

The feedback module 23 is configured to feed back detected error information in response to the detected error information of any component.

A restart module 25 is configured to restart the vehicle' automatic driving function based on a feedback result, wherein the feedback result is feedback by the processor according the detected error information.

It should be noted here that the above-mentioned detection module 21, feedback module 23 and restart module 25 correspond to steps S102 to S106 of Embodiment 1, and the above-mentioned modules are identical to examples and application scenarios implemented by the corresponding steps, but are not limited to the disclosure of Embodiment 1. It should be noted that the above-described modules, as part of the device, may be executed in a computer system, such as a set of computer-executable instructions.

It can be seen from the above that in the above-mentioned embodiment of the present application, error information of different components in a vehicle can be detected by using a detection module, wherein the different components comprise at least one of the following: a power supply, a sensor, a navigation device, a log memory and a processing device; when the feedback module detects error information of any one component, the error information is fed back to the processor; and a restart module restarts the vehicle' automatic driving function based on a feedback result, wherein the feedback result is feedback by the processor according the detected error information. The device for controlling the autonomous driving vehicle provided in the embodiment of the present invention realizes the purpose of detecting different components of the vehicle to determine whether there is error information in different components, and when there is error information in the components of the vehicle, the processor is used to analyze and process the error information, and the automatic driving function of the vehicle is restarted based on the feedback result of the processor. This achieves the technical effect of improving the reliability of the vehicle, and thus solves the technical problem that the autonomous driving vehicle in the related technology cannot perform error information detection on the components in the vehicle, which leads to the low reliability of the autonomous driving vehicle.

In an optional embodiment, the device for controlling the autonomous driving vehicle further comprises: a first acquisition module, configured to acquire data sensed by an inertial sensor; and a calculation module, configured to calculate a navigation path of the vehicle by using a navigation algorithm based on the data, wherein the vehicle is compatible with at least one type of inertial sensor.

In an optional embodiment, the device for controlling the autonomous driving vehicle further comprises: a setting module, configured to set priorities of different radars; a determination module, configured to determine time synchronization protocols of the different radars based on the priorities of the different radars; and a synchronization module, configured to synchronize time by different radars according to a corresponding time synchronization protocol.

In an optional embodiment, the device for controlling the autonomous driving vehicle further comprises: a first acquisition module, configured to acquire data sensed by an inertial sensor; and a calculation module, configured to calculate calculating based on the data, a navigation path of the vehicle by using a navigation algorithm, wherein the vehicle is compatible with at least one type of inertial sensor.

In an optional embodiment, the device for controlling the autonomous driving vehicle further comprises: a setting module, configured to set priorities of different radars; a determination module, configured to determine time synchronization protocols of the different radars based on the priorities of the different radars; and a synchronization module, configured to synchronize time by different radars according to a corresponding time synchronization protocol.

In an optional embodiment, the device for controlling the autonomous driving vehicle further comprises: a receiving module, configured to receive an external upgrading instruction and receiving an upgrading file in combination with a Long Term Evolution (LTE) module; and an upgrading module, configured to enter an on-line upgrading mode or an off-line upgrading working mode based on the external upgrading instruction, and running the upgrading file to complete system upgrading.

In an optional embodiment, the device for controlling the autonomous driving vehicle further comprises: a second acquisition module, configured to acquire different reset instructions, wherein the different reset instructions are configured to control different components in the vehicle to reset, and the different reset instructions comprises reset priorities; a control module, configured to control a corresponding component to reset according to the reset priorities of the different reset instructions; and a starting module, configured to restart corresponding component to enter a working mode, when the corresponding component is successfully reset.

In an optional embodiment, the control module comprises: a setting module, configured to put the components to be reset into a reset queue; a first switching module, configured to switch the components to be reset in the reset queue to be reset states; a second switching module, configured to switch the successfully reset components into be waiting states, when the components in the reset states are successfully reset; and a third switching module, configured to switch the successfully reset components from the waiting states to enabling states after a predetermined period is reached.

In an optional embodiment, when each component to be reset in the reset queue is successfully reset, an operating state of the component is detected, and the component in the enabling state is switched to a receiving state to receive an external control instruction.

Embodiment 3

According to another aspect of an embodiment of the present invention, there is also provided a computer-readable storage medium, wherein when each component to be reset in the reset queue is successfully reset, an operating state of the a component is detected, and the component in the enabling state is switched to a receiving state to receive an external control instruction described above.

Embodiment 4

According to another aspect of an embodiment of the present invention, there is also provided a processor, wherein the processor is configured to run a program, when being run, the program executes the method for controlling the autonomous driving vehicle described above.

Embodiment 5

According to another aspect of an embodiment of the present invention, there is also provided an autonomous driving vehicle including a memory and a processor coupled to the memory, wherein the memory and the processor communicate via a bus system; the memory is used for storing a program, wherein when the program is executed by the processor, the program controls an apparatus on which the memory is located to execute any one of the control methods of the autonomous driving vehicle described above; the processor is used for running a program, wherein the program executes any one of the method for controlling the autonomous driving vehicle described above when running.

The sequence numbers of the foregoing embodiments of the present invention are only for description, and do not represent the superiority of the embodiments.

In the above-described embodiments of the present invention, the description of each embodiment has its own focus. For portions that are not described in detail in an embodiment, reference may be made to related descriptions of other embodiments.

In the several embodiments provided herein, it should be understood that the disclosed techniques may be implemented in other ways. The device embodiments described above are merely illustrative, e.g. the division of the units may be one logical function division and there may be additional divisions in actual implementation, e.g. multiple units or assemblies may be combined or integrated into another system, or some features may be omitted or not performed. Optionally, the couplings or direct couplings or communicative connections shown or discussed with respect to one another may be indirect couplings or communicative connections through some interface, units or modules, and may be electrical or otherwise.

The units described as separate elements may or may not be physically separate, and the elements shown as units may or may not be physical units, i.e., may be located in one place, or may be distributed across multiple units. Some or all of the units may be selected to achieve the objectives of the scheme of the embodiment according to practical requirements.

Furthermore, the functional units in the various embodiments of the present invention may be integrated into one processing unit, may be physically separate from each other, or may be integrated into one unit in two or more units. The integrated units described above can be implemented either in hardware or in software functional units.

The integrated units may be stored in a computer readable storage medium if implemented in the form of a software functional unit and sold or used as a stand-alone product. Based on this understanding, concerning the technical solution of the present invention, the nature thereof or the part that contributes to the prior art, or all or part of the technical solution can be embodied in the form of a software product. The computer software product is stored in a storage medium, including a number of instructions. In this way, a computer apparatus (which may be a personal computer, a server, or a network apparatus, etc.) executes all or part of the steps of the method described in each embodiment of the present invention. The aforementioned storage medium includes: U disk, Read-Only Memory (ROM), Random Access Memory, mobile hard disk, magnetic or optical disk and other media of various kinds that can store program code.

The above are only the preferred embodiments of the present invention. It should be pointed out that for those of ordinary skills in the art, without departing from the principle of the present invention, several improvements and modifications can be made, and these improvements and modifications are also regarded as the protection scope of the present invention.

What is claimed is:

1. A method for controlling an autonomous driving vehicle, the method comprising:
   detecting error information of different components in a vehicle, wherein the different components comprise at least one of the following: a power supply, a sensor, a navigation device, a log memory and a processing device;
   in response to detected error information of any component, feeding back the detected error information to a processor;
   restarting the vehicle's automatic driving function based on a feedback result, wherein the feedback result is feedback by the processor according the detected error information;
   wherein the method further comprises: acquiring different reset instructions, wherein the different reset instructions are configured to control different components in the vehicle to reset, and the different reset instructions comprises reset priorities; controlling a corresponding component to reset according to the reset priorities of the different reset instructions; when the corresponding component is successfully reset, restarting the corresponding component to enter a working mode; wherein controlling the corresponding component to reset according to the reset priorities of the different reset instructions, comprising:
   wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached; wherein when each component to be reset in the reset queue is successfully reset, an operating state of the a component is detected, and the component in the enabling state is switched to a receiving state to receive an external control instruction.

2. The method as claimed in claim 1, wherein when the sensor is an inertial sensor, the method further comprises:
   acquiring data sensed by the inertial sensor; and
   calculating based on the data, a navigation path of the vehicle by using a navigation algorithm, wherein the vehicle is compatible with at least one type of inertial sensor.

3. The method as claimed in claim 1, wherein the method further comprises:
   setting priorities of different radars;
   determining time synchronization protocols of the different radars based on the priorities of the different radars;
   controlling the different radars to synchronize time according to a corresponding time synchronization protocol.

4. The method as claimed in claim 1, wherein the method further comprises:
   receiving an external upgrading instruction and receiving an upgrading file in combination with a Long Term Evolution (LTE) module; and
   entering an on-line upgrading mode or an off-line upgrading working mode based on the external upgrading instruction, and running the upgrading file to complete system upgrading.

5. A Non-transitory Computer-Readable Storage Medium, wherein the computer-readable storage medium comprises a computer program, when the computer program is run, a device where the computer-readable storage medium is located is controlled to execute the method for controlling the autonomous driving vehicle, wherein the method comprises:
   detecting error information of different components in a vehicle, wherein the different components comprise at least one of the following: a power supply, a sensor, a navigation device, a log memory and a processing device;
   in response to detected error information of any component, feeding back the detected error information to a processor;
   restarting the vehicle's automatic driving function based on a feedback result, wherein the feedback result is feedback by the processor according the detected error information;
   wherein the method further comprises: acquiring different reset instructions, wherein the different reset instructions are configured to control different components in the vehicle to reset, and the different reset instructions comprises reset priorities; controlling a corresponding component to reset according to the reset priorities of the different reset instructions; when the corresponding component is successfully reset, restarting the corresponding component to enter a working mode; wherein controlling the corresponding component to reset according to the reset priorities of the different reset instructions, comprising:
   wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached; wherein when each component to be reset in the reset queue is successfully reset, an operating state of the a component is detected, and the component in the enabling state is switched to a receiving state to receive an external control instruction.

6. A processor, wherein the processor is configured to run a program, when being run, the program executes the method for controlling the autonomous driving vehicle, wherein the method comprises:
  detecting error information of different components in a vehicle, wherein the different components comprise at least one of the following: a power supply, a sensor, a navigation device, a loci memory and a processing device;
  in response to detected error information of any component, feeding back the detected error information to a processor;
  restarting the vehicle's automatic driving function based on a feedback result, wherein the feedback result is feedback by the processor according the detected error information;
  wherein the method further comprises: acquiring different reset instructions, wherein the different reset instructions are configured to control different components in the vehicle to reset, and the different reset instructions comprises reset priorities; controlling a corresponding component to reset according to the reset priorities of the different reset instructions; when the corresponding component is successfully reset, restarting the corresponding component to enter a working mode; wherein controlling the corresponding component to reset according to the reset priorities of the different reset instructions, comprising:
  wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached; wherein when each component to be reset in the reset queue is successfully reset, an operating state of the a component is detected, and the component in the enabling state is switched to a receiving state to receive an external control instruction.

7. An autonomous driving vehicle, the vehicle comprising:
  a memory and a processor coupled to the memory, wherein the memory and the processor communicate via a bus system;
  the memory is used for storing a program, wherein when the program is executed by the processor, the program controls an apparatus on which the memory is located to execute the method for controlling the autonomous driving vehicle, wherein the method comprises:
  detecting error information of different components in a vehicle, wherein the different components comprise at least one of the following: a power supply, a sensor, a navigation device, a log memory and a processing device; in response to detected error information of any component, feeding back the detected error information to a processor; restarting the vehicle's automatic driving function based on a feedback result, wherein the feedback result is feedback by the processor according the detected error information;
  wherein the method further comprises: acquiring different reset instructions, wherein the different reset instructions are configured to control different components in the vehicle to reset, and the different reset instructions comprises reset priorities; controlling a corresponding component to reset according to the reset priorities of the different reset instructions; when the corresponding component is successfully reset, restarting the corresponding component to enter a working mode; wherein controlling the corresponding component to reset according to the reset priorities of the different reset instructions, comprising:
  wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached; wherein when each component to be reset in the reset queue is successfully reset, an operating state of the a component is detected, and the component in the enabling state is switched to a receiving state to receive an external control instruction;
  the processor is used for running a program, wherein the program executes the method for controlling the autonomous driving vehicle, wherein the method comprises:
  detecting error information of different components in a vehicle, wherein the different components comprise at least one of the following: a power supply, a sensor, a navigation device, a log memory and a processing device; in response to detected error information of any component, feeding back the detected error information to a processor; restarting the vehicle's automatic driving function based on a feedback result, wherein the feedback result is feedback by the processor according the detected error information;
  wherein the method further comprises: acquiring different reset instructions, wherein the different reset instructions are configured to control different components in the vehicle to reset, and the different reset instructions comprises reset priorities: controlling a corresponding component to reset according to the reset priorities of the different reset instructions; when the corresponding component is successfully reset, restarting the corresponding component to enter a working mode; wherein controlling the corresponding component to reset according to the reset priorities of the different reset instructions, comprising:
  wherein controlling the corresponding component to reset according to the reset priorities of the different reset instructions, comprising: putting components to be reset into a reset queue; switching the components to be reset in the reset queue to be reset states; when the components in the reset states are successfully reset, switching the successfully reset components into be waiting states; and switching the successfully reset components from the waiting states to enabling states after a predetermined period is reached; wherein when each component to be reset in the reset queue is successfully reset, an operating state of the a component is detected, and the component in the enabling state is switched to a receiving state to receive an external control instruction.

8. The method as claimed in claim 2, wherein the data comprise at least one of the following: accelerated speed, inclination angle, impact magnitude, vibration frequency.

9. The method as claimed in claim 2, wherein in the navigation algorithm, each node of a network independently periodically determine and decide whether itself enter hibernation or remain awake in a distributed manner.

10. The method as claimed in claim 3, wherein the time synchronization protocols is precision time protocol.

* * * * *